United States Patent
Sautter et al.

(10) Patent No.: US 8,496,145 B2
(45) Date of Patent: Jul. 30, 2013

(54) VEHICLE RACK FOR CARRYING A WHEEL

(75) Inventors: Chris Sautter, Portland, OR (US);
James Buckroyd, Portland, OR (US);
Zac Elder, Portland, OR (US); **Doug
Fjelland, Medford, OR (US); Charles
Kraeuter**, Portland, OR (US)

(73) Assignee: **Yakima Innovation Development
Corporation**, Georgetown, Grand
Cayman (KY)

( * ) Notice: Subject to any disclaimer, the term of this
patent is extended or adjusted under 35
U.S.C. 154(b) by 321 days.

(21) Appl. No.: 12/817,032

(22) Filed: Jun. 16, 2010

(65) Prior Publication Data

US 2011/0139842 A1    Jun. 16, 2011

Related U.S. Application Data (63) Continuation-in-part of application No. 12/795,280, filed on Jun. 7, 2010, now abandoned, which is a continuation-in-part of application No. 12/795,463, filed on Jun. 7, 2010, application No. 12/817,032, which is a continuation-in-part of application No. 12/816,121, filed on Jun. 15, 2010.

(60) Provisional application No. 61/187,605, filed on Jun. 16, 2009, provisional application No. 61/184,691, filed on Jun. 5, 2009, provisional application No. 61/185,152, filed on Jun. 8, 2009, provisional application No. 61/187,197, filed on Jun. 15, 2009.

(51) Int. Cl.
*B60R 9/10* (2006.01)

(52) U.S. Cl.
USPC ............ 224/315; 224/319; 224/324; 224/924

(58) Field of Classification Search
USPC .......................... 224/315, 319, 324, 309, 924
See application file for complete search history.

(56) References Cited

U.S. PATENT DOCUMENTS

| | | | |
|---|---|---|---|
| 3,828,993 | A | 8/1974 | Carter |
| 3,892,455 | A | 7/1975 | Sotolongo |
| 4,976,123 | A | 12/1990 | Ceron et al. |
| 5,119,654 | A | 6/1992 | Ceron et al. |
| 5,136,709 | A | 8/1992 | Shirakabe et al. |

(Continued)

FOREIGN PATENT DOCUMENTS

| | | | |
|---|---|---|---|
| EP | 0894672 A1 | 2/1999 | |
| EP | 1442940 A1 | 8/2004 | |

(Continued)

OTHER PUBLICATIONS

Machine translation of JP2000318538A.*

(Continued)

*Primary Examiner* — Justin Larson
(74) *Attorney, Agent, or Firm* — Kolisch Hartwell, P.C.

(57) ABSTRACT

A vehicle rack for carrying a bicycle wheel, a wheel carrier mountable on a load supporting bar of a vehicle rack, and methods of using a vehicle rack and/or wheel carrier to hold a bicycle wheel. In some embodiments, the wheel carrier may include a base, a pair of arms connected to the base and defining slots for receiving an axle of a bicycle wheel, and a strap securable to the base over a rim of the bicycle wheel to restrict removal of the wheel from the arms.

15 Claims, 9 Drawing Sheets

U.S. PATENT DOCUMENTS

| | | | |
|---|---|---|---|
| 5,226,570 A | 7/1993 | Pedrini | |
| 5,275,320 A * | 1/1994 | Duemmler | 224/319 |
| 5,456,396 A | 10/1995 | Allen | |
| 5,492,258 A * | 2/1996 | Brunner | 224/321 |
| 5,526,971 A | 6/1996 | Despain | |
| 5,598,959 A * | 2/1997 | Lorensen et al. | 224/315 |
| 5,769,292 A | 6/1998 | Cucheran et al. | |
| 5,779,119 A | 7/1998 | Talbot et al. | |
| 5,845,828 A | 12/1998 | Settelmayer | |
| 6,193,252 B1 | 2/2001 | Lin | |
| 6,422,441 B1 | 7/2002 | Settelmayer et al. | |
| 6,460,743 B2 | 10/2002 | Edgerly et al. | |
| 6,561,398 B1 * | 5/2003 | Cole et al. | 224/324 |
| 6,681,971 B2 | 1/2004 | Laverack et al. | |
| 6,918,521 B2 | 7/2005 | Settelmayer et al. | |
| 7,000,811 B2 | 2/2006 | Gilstrap et al. | |
| 7,044,347 B1 * | 5/2006 | Pedrini | 224/501 |
| 7,051,909 B2 | 5/2006 | Gibson | |
| 7,234,617 B2 * | 6/2007 | Weaver et al. | 224/324 |
| 7,416,098 B2 | 8/2008 | Settelmayer et al. | |
| 8,020,737 B2 * | 9/2011 | Sweeney | 224/324 |
| 8,021,169 B1 | 9/2011 | Smith | |
| 8,136,708 B2 | 3/2012 | Sautter et al. | |
| 8,136,709 B2 | 3/2012 | Jeli et al. | |
| 8,245,893 B2 | 8/2012 | Sautter et al. | |
| 2005/0145639 A1 | 7/2005 | Viklund et al. | |
| 2006/0273124 A1 | 12/2006 | Bogoslofski | |
| 2006/0289577 A1 | 12/2006 | Malone | |
| 2008/0029563 A1 * | 2/2008 | Malone | 224/319 |
| 2008/0164292 A1 * | 7/2008 | Farney | 224/324 |
| 2009/0120982 A1 | 5/2009 | Sautter et al. | |
| 2010/0078454 A1 | 4/2010 | Sautter et al. | |
| 2011/0132946 A1 | 6/2011 | Sautter et al. | |
| 2011/0139838 A1 | 6/2011 | Sautter et al. | |
| 2011/0139841 A1 | 6/2011 | Sautter et al. | |
| 2012/0234881 A1 | 9/2012 | Sautter et al. | |

FOREIGN PATENT DOCUMENTS

| | | | |
|---|---|---|---|
| JP | 2000318538 A * | 11/2000 | |
| WO | WO9624509 A1 | 8/1996 | |
| WO | WO9810959 A1 | 3/1998 | |
| WO | WO2009158360 A1 | 12/2009 | |
| WO | WO2010148011 A1 | 12/2010 | |

OTHER PUBLICATIONS

European Patent Office, International Search Report and Written Opinion of the International Searching Authority in PCT/US2010/038704, Nov. 30, 2010, 12 pages.

The International Bureau of WIPO, International Preliminary Report on Patentability, in PCT/US2010/038704, Dec. 16, 2011, 9 pages.

US Patent and Trademark Office, Office Action regarding U.S. Appl. No. 12/816,121, Nov. 2, 2012, 13 pages.

* cited by examiner

VEHICLE RACK FOR CARRYING A WHEEL

CROSS-REFERENCES TO PRIORITY APPLICATIONS

This application claims priority from U.S. Provisional Patent Application Ser. No. 61/187,605, filed Jun. 16, 2009.

This application is a continuation-in-part of U.S. patent application Ser. No. 12/795,280, filed Jun. 7, 2010, which in turn claims priority from U.S. Provisional Patent Application Ser. No. 61/184,691, filed Jun. 5, 2009.

This application also is a continuation-in-part of U.S. patent application Ser. No. 12/795,463, filed Jun. 7, 2010, which in turn claims priority from U.S. Provisional Patent Application Ser. No. 61/185,152, filed Jun. 8, 2009.

This application further is a continuation-in-part of U.S. patent application Ser. No. 12/816,121, filed Jun. 15, 2010, which in turn claims priority from U.S. Provisional Patent Application Ser. No. 61/187,197, filed Jun. 15, 2009.

Each of the above-cited priority applications is incorporated herein by reference.

BACKGROUND

Bike racks that clamp the front fork of a bike (a "fork mount") are desirable particularly for high-end bike frames. These racks avoid the need to clamp the tubes of the frame, and they hold the bike more firmly, substantially avoiding incidental vibration and movement of the bike frame in transit. However, when a fork mount is used to carry a bike, the front wheel that has been removed must be carried somewhere else. Thus, there is sometimes a need for a device for carrying an isolated wheel. Similar needs exist for support vehicles that carry spare wheels for races or organized road tours. This type of device may be referred to as a "wheel carrier, a "front wheel holder," or a "wheel mount."

Wheel carriers are inadequate for many purposes. Some wheel carriers are not mountable on crossbars of various shapes and sizes. Some wheel carriers are not versatile enough to carry wheels of different sizes. Some wheel carriers do not hold a wheel sufficiently tightly to minimize vibrations, which may be noisy, annoying, and potentially damaging to the wheel and/or wheel carrier. Some wheel carriers do not adequately protect against theft. Thus, there is a need for an improved wheel carrier.

SUMMARY

The present disclosure provides a vehicle rack for carrying a bicycle wheel, a wheel carrier mountable on a load supporting bar of a vehicle rack, and methods of using a vehicle rack and/or wheel carrier to hold a bicycle wheel. In some embodiments, the wheel carrier may include a base, a pair of arms connected to the base and defining slots for receiving an axle of a bicycle wheel, and a strap securable to the base over a rim of the bicycle wheel to restrict removal of the wheel from the arms.

DETAILED DESCRIPTION

The present disclosure provides a vehicle rack for carrying a bicycle wheel, a wheel carrier mountable on a load supporting bar of a vehicle rack, and methods of using a vehicle rack and/or wheel carrier to hold a bicycle wheel. In some embodiments, the wheel carrier may include a base, a pair of arms connected to the base and defining slots for receiving an axle of a bicycle wheel, and a strap securable to the base over a rim of the bicycle wheel to restrict removal of the wheel from the arms.

The wheel carrier may be for use with a vehicle rack to enable transport of a wheel that has been removed from a bicycle. The base may be equipped with a clamp to mount the base on a load supporting bar of a vehicle rack. The wheel carrier also may include a security lock having a locked position that prevents an unauthorized person from opening the clamp and from releasing the strap when the strap is secured to the base, thereby allowing the same lock to discourage theft of the wheel carrier and the wheel.

In some embodiments, the wheel carrier may include a clamp for mounting the wheel carrier on a load supporting bar of a vehicle rack. The clamp may include jaws to engage the load supporting bar. The jaws may have an adjustable spacing from one another along a linear horizontal axis when the pair of arms project upwardly in a wheel receiving position.

In some embodiments, the wheel carrier may be a wheel holder for use with a vehicle rack to enable transport of a bicycle wheel. The base may include a pair of latches. The strap may be securable to the base over a rim of a bicycle wheel to hold the bicycle wheel adjacent the base. The strap may have opposing ends regions that each are securable by a respective latch. The wheel holder further may include a security lock having a locked position that prevents an unauthorized person from releasing either end region of the strap when secured to the base, by blocking either latch from being opened, using the same lock.

A vehicle rack may be provided for carrying a wheel that has been removed from a bicycle. The rack may include a load supporting bar, such as a crossbar, configured to be attached to a vehicle such that the bar is oriented horizontally. The rack also may include a wheel carrier mountable on the load supporting bar and including a base, a pair of arms connected to the base and defining slots for receiving an axle of a bicycle wheel, and a strap securable to the base over a rim of the bicycle wheel to block removal of the bicycle wheel from the arms.

I. Vehicle Rack with Wheel Carrier

This section describes an exemplary vehicle rack including an exemplary embodiment of a wheel carrier, which also or alternatively may be described as a wheel holder.

Figure 1:
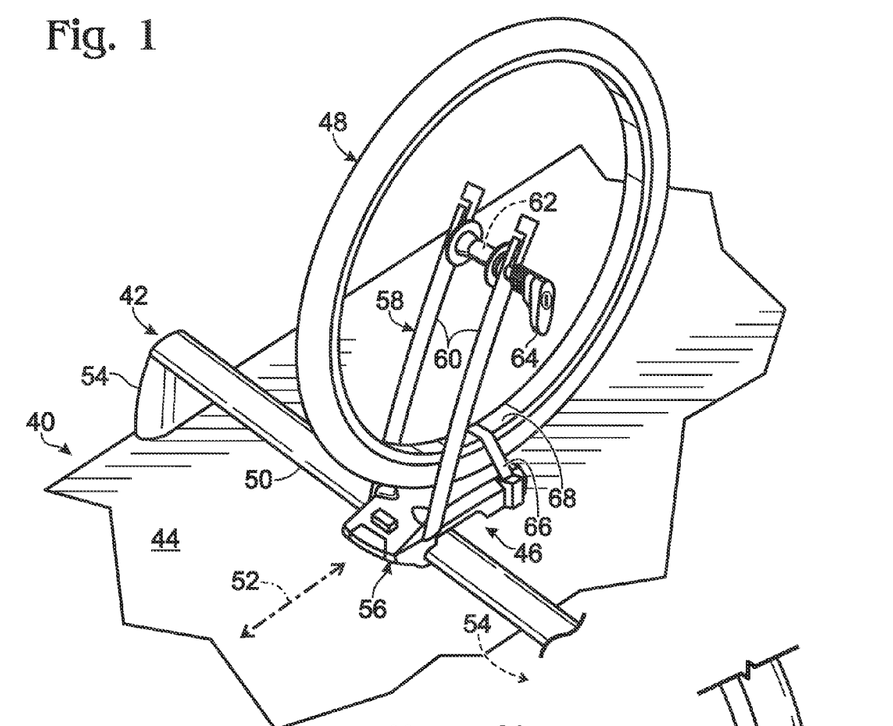
FIG. 1 is a fragmentary view of a vehicle supporting an exemplary vehicle rack positioned above the roof of the vehicle, with the vehicle rack including an exemplary wheel carrier holding an isolated bicycle wheel, in accordance with aspects of the present disclosure.

FIG. 1 shows a vehicle 40 supporting an exemplary vehicle rack 42 positioned above a roof 44 of the vehicle. Rack 42 may include a wheel carrier 46 holding an isolated bicycle wheel 48, which is mounted on the wheel carrier. Wheel carrier 46 may be a rack accessory that is mounted removably on a load supporting bar 50 of vehicle rack 42, or may be mounted permanently.

Vehicle 40 may, for example, be a land-based and/or wheeled vehicle, and may be motor-driven. Exemplary vehicles include cars, trucks, vans, recreational vehicles (RVs), and the like. A vehicle may include a trailer.

Rack 42 may be mounted at any suitable position on the vehicle. Exemplary positions include above the vehicle (e.g., mounted to the vehicle's roof), behind the vehicle (e.g., mounted to the back of the vehicle adjacent the vehicle's rear windshield and/or mounted to a vehicle hitch), or mounted to a trailer, among others.

Rack 42 may be equipped with one or more load supporting bars 50, such as at least a pair of the bars. Each bar 50 may be disposed horizontally, vertically, at a slant with respect to horizontal and vertical, or a combination thereof.

Horizontal and vertical orientations are defined with respect to the direction of gravitational force. A vertical orientation is substantially parallel to the direction of gravitational force, for example, within about 20 or 10 degrees of exactly parallel. A horizontal orientation is substantially orthogonal to the direction of gravitational force, for example, within about 20 or 10 degrees of perfectly orthogonal.

Each bar 50 may (or may not) be a crossbar that extends across the vehicle. The bar may extend horizontally, substantially orthogonal to a long axis and/or travel direction 52 of vehicle 40. Bar 50 may have any suitable cross-sectional shape, such as circular, oval/elliptical, polygonal (e.g., rectangular or square), or the like. In some embodiments, as described below, wheel carrier 46 may be configured to be mounted on various bars 50 of different shapes and/or sizes.

Bar 50 may be secured to vehicle 40 by any suitable attachment device, such as towers 54, which may elevate or otherwise space the bar from the vehicle. In exemplary embodiments, each bar 50 is secured to the vehicle using a pair of towers 54 disposed at opposing ends of the bar.

Wheel carrier 46 may incorporate a base 56 and a fork 58 connected to and projecting from the base. Base 56 may engage bar 50, to fix the wheel carrier on the bar such that the ability of the wheel carrier to slide along the bar and twist about the bar is restricted.

Fork 58 may provide a pair of the arms 60 to receive a portion of wheel 48, particularly an axle 62 thereof. Axle 62 may be provided by a skewer assembly that also is equipped with a cam lever 64. Lever 64 may be operable to secure wheel 48 to, and release the wheel from, a front fork of a bicycle (and, optionally, arms 60). In some embodiments, the wheel carrier may lack a fork and/or arms, such as when the wheel carrier is used to hold a bicycle wheel that is still attached to a bicycle frame. Accordingly, the wheel carrier may be used as a wheel holder that cooperates with a bike mount.

Arms 60 may be structured to be analogous to the arms of the front fork of a bicycle. Arms 60 may be longer than the radius of a bicycle wheel (or of the radii of bicycle wheels of various sizes, such as wheels for road bikes, trail bikes, children's bikes, track bikes, etc.). Arms 60 may extend generally parallel to one another, for example, defining long axes that are parallel to one another. The arms may be spaced from one another by about the same separation as the arms of a bicycle's front fork.

Wheel carrier 46 also may be equipped with at least one strap 66. The strap may be securable to base 56, and over rim 68 of wheel 48 (and in engagement with the rim), to restrict removal of bicycle wheel 48 from the wheel carrier, such as to restrict removal of axle 62 from arms 60 and/or to restrict separation of wheel 48 from base 56 (i.e., to hold the wheel adjacent the base (with or without contact of the wheel with the base)).

Figure 2:
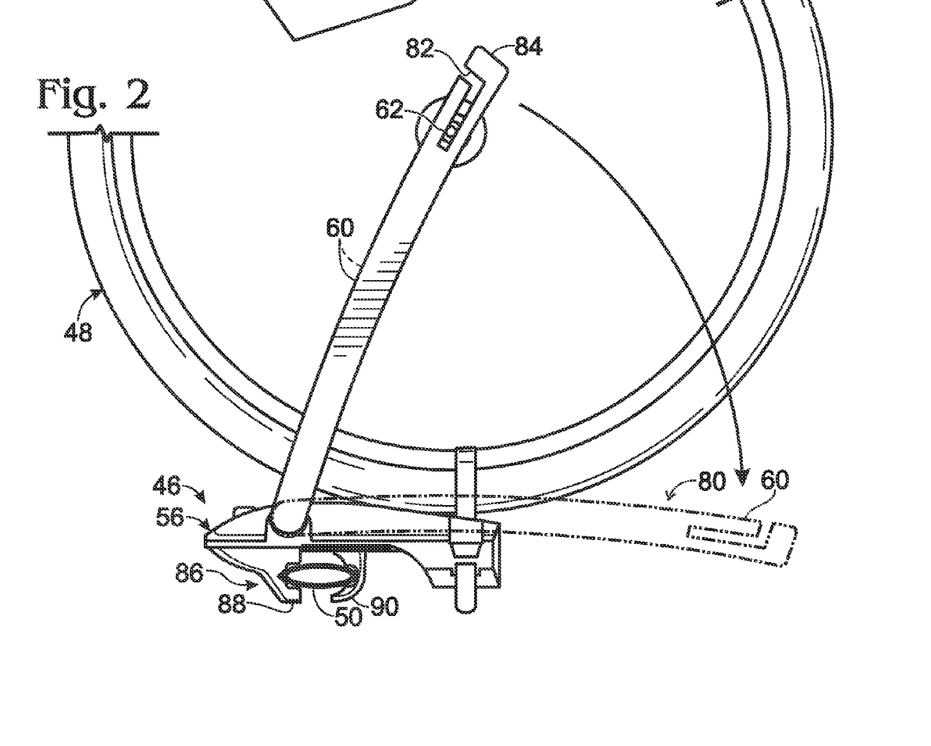
FIG. 2 is a partially fragmentary, side view of the wheel carrier and bicycle wheel of FIG. 1, taken with the wheel carrier mounted on a crossbar of the vehicle rack and with a cam lever of the wheel's skewer assembly removed.

FIG. 2 shows wheel carrier 46 and wheel 48 from the side. Arms 60 (and/or fork 58; see FIG. 1) may be pivotable, as a unit, with respect to base 56. The arms may have a wheel receiving position, in which the arms extend upwardly from base 56, as shown here. In the wheel receiving position, the arms may extend at any suitable angle with respect to the direction of gravitational force, such as substantially parallel (e.g., within about 20 or 10 degrees from parallel) or oblique to the direction of gravitational force (e.g., about 20 to 60 degrees from parallel). For example, the arms may slant rearwardly, as shown here. The arms also may have a storage position, indicated in phantom outline at 80, in which the arms extend horizontally. The arms may be raised to the wheel receiving position from the storage position and may be lowered to the storage position from the wheel receiving position. Further aspects of load-carrying members that include an arm are disclosed in U.S. Patent Application Publication No. 2009/0120982, which is incorporated herein by reference.

Each arm may define at least one slot 82. The slot may be formed near a distal end 84 of arm 60, generally with the distance of slot 82 from base 56 being about the same as or greater than a radius of wheel 48. Slot 82 may form a receiver at which axle 62 can be received from an end or a side of arms 60. In the present illustration, the slot has a mouth formed on the side of arm 60. The slot is generally wide enough to receive a segment of wheel axle 62. The slot may or may not be elongate and may extend along arm 60 and partially across the arm. In the present illustration, slot 82 extends both partially across and then along arm 60 on an L-shaped path. The slot may be elongate in a direction along arm 60 to permit wheels of different size (i.e., having distinct radii) to be used with the same wheel carrier. In other words, smaller wheels may have their axles disposed farther down slot 82 toward base 56, while larger wheels may have their axles disposed closer to distal end 84, when the wheel is secured to the carrier. In other embodiments, slot 82 may extend obliquely to the long axis of arm 60.

Base 56 may provide a bar mount, such as a clamp 86, for attachment to bar 50. The clamp may opposingly engage bar 50 with a pair of jaws 88, 90, to fix the position of the wheel carrier on the bar. The jaws may be formed by a lower, depending portion of base 56. The clamp may be adjustable between an open position that permits removal of the clamp from the load supporting bar and a closed position that blocks such removal.

Figure 3:
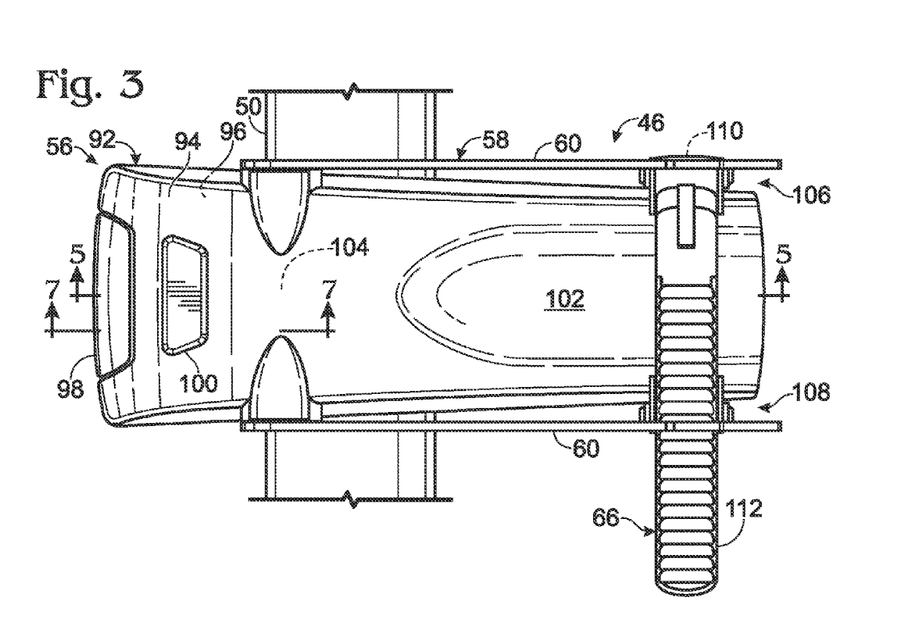
FIG. 3 is a top view of the wheel carrier of FIG. 1 mounted on the crossbar, in the absence of the bicycle wheel and with one end of a strap of the wheel carrier released.

FIG. 3 shows a top view of wheel carrier 46 mounted on load supporting bar 50, in the absence of wheel 48 and with one end of strap 66 released. Base 56 may include a body 92 formed by an upper body member 94 and a lower body member 96, which may be individual, discrete pieces.

Base 56 may be equipped with a pair of user controls, which may be formed near a front end of base 56 and supported movably by body 92. First, a graspable handle, such as a knob 98, for manually adjusting the clamp may be included in a nose of the base. Second, a button 100 to unlock arms 60 and/or control their ability to pivot may be accessible from above base 56 (and/or body 92).

Body 92 may provide a wheel well or recess 102 formed in a top surface of upper body member 94 and extending, for example, to a back end of base 56. Recess 102 may receive a portion of the wheel's tire for engagement with a top surface of body 92 at the recess. In other words, after disposing the axle of the wheel in the slots of arms 60, the strap may be tightened against the wheel's rim to urge the wheel's tire against body 92.

Fork 58 may be generally U-shaped, with an axle 104 that connects arms 60 to each other. Axle 104 may extend transversely through base 56 (and body 92), between opposing sides thereof. Arms 60 may be structured as plates defining long axes that are substantially parallel to each other.

The wheel carrier may include a wheel-securement assembly that includes a strap and at least one buckle or latch to secure one or both ends of the strap. For example, base 56 may provide at least one latch to secure the strap to the base. In some embodiments, the base may include a pair of latches 106, 108 that secure respective opposing end regions 110, 112 of strap 66 to the base. The latches may be connected to body 92 on opposing sides of base 56, near its back end, and may be pivotably connected to body 92, generally flanking wheel recess 102.

Figure 4:
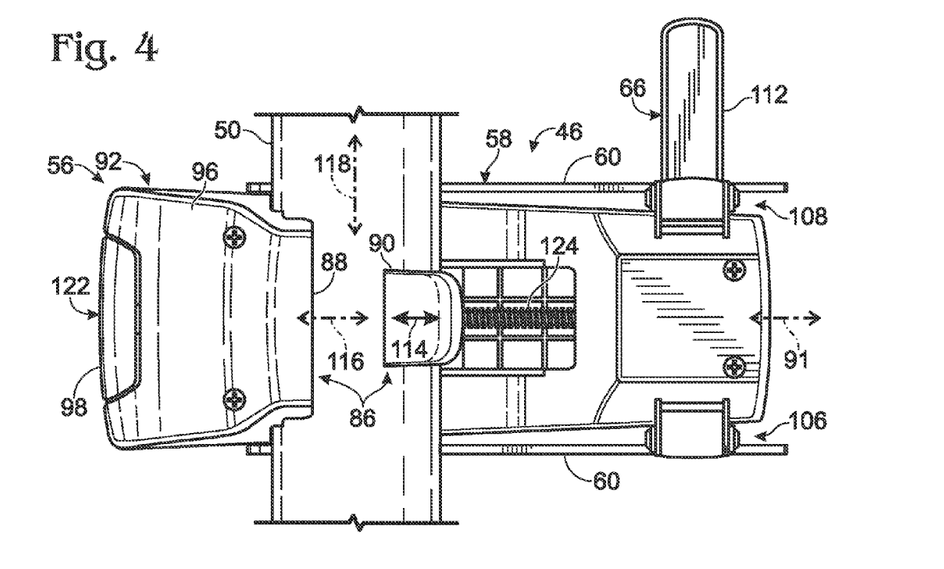
FIG. 4 is a bottom view of the wheel carrier of FIG. 1 mounted on the crossbar, in the absence of the bicycle wheel and with one end of a strap of the wheel carrier released.

FIG. 4 shows a bottom view of wheel carrier 46. Clamp 86 may be formed by fixed jaw 88 and movable jaw 90 (e.g., a slidable jaw), which collectively form a cavity between each other to receive load supporting bar 50, with bar 50 extending orthogonally to a long axis 91 of base 56. Fixed jaw 88 may, for example, be formed as a downward projection from body 92. Slidable jaw 90 may be capable of reciprocative motion, indicated at 114, toward and away from fixed jaw 88, to change the spacing between the jaws. Motion of slidable jaw 90 may be along a linear motion axis 116. The motion axis may be horizontal. Also, or alternatively, the motion axis may be substantially orthogonal to a long axis 118 defined by bar 50 and/or substantially parallel to long axis 91 of base 56. Clamp 86 may be described as a horizontal clamp, meaning that linear motion axis 116 is horizontal when the clamp is mounted on bar 50 and/or when arms 60 are oriented upward in their wheel receiving position.

Slidable jaw 90 may be driven in either direction along motion axis 116 by operation of a drive member 122. The drive member may be a threaded drive member disposed in threaded engagement with slidable jaw 90. For example, drive member 122 may include a threaded rod 124, such as a drive screw that extends through slidable jaw 90. Drive member 122 may have a substantially fixed axial position in body 92, such that rotation of the drive member causes translational motion of slidable jaw 90 without net displacement of the drive member. The drive member also may include knob 98, which may be turned by hand to rotate threaded rod 124, which adjusts clamp 86.

Figure 5:
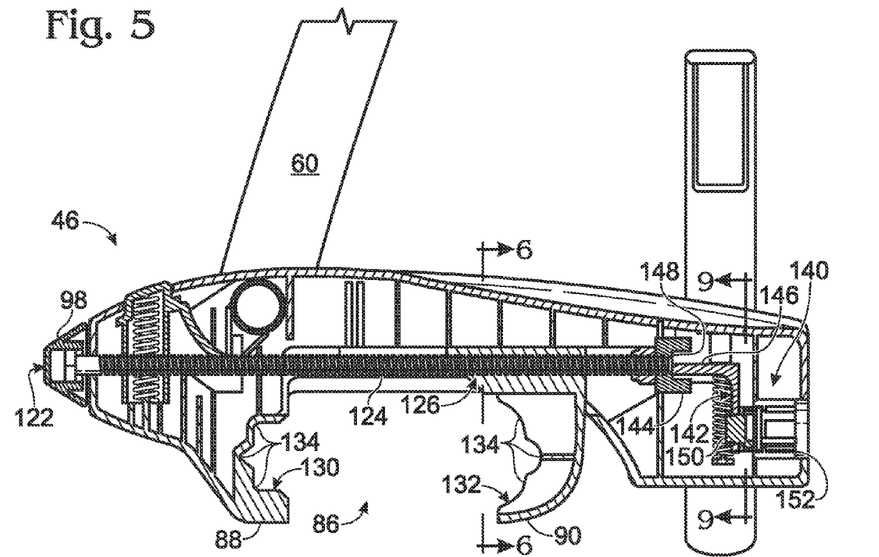
FIG. 5 is a longitudinal sectional view of the wheel carrier of FIG. 1, taken generally along line 5-5 of FIG. 3 in the absence of the crossbar.

FIG. 5 shows a longitudinal sectional view of wheel carrier 46. Threaded engagement of threaded rod 124 with slidable jaw 90 is indicated by an arrow at 126.

Clamp 86 may be a "universal" clamp capable of effective engagement of bars having different cross-sectional shapes and/or sizes. To achieve this ability, fixed jaw 88 and slidable jaw 90 may have respective bar-engagement surface regions 130, 132 that are contoured to be wavy or sinuous in profile, to form a plurality of notches 134, such as at least three notches in one or both surface regions 130, 132. More particularly, each surface region 130, 132, in profile, may include a plurality of distinct concave and/or convex surface regions having different curvatures, a discernable and/or sharp boundary between adjoining surface regions, different shapes (angular versus curved), and/or the like. In some embodiments, the respective profiles of the fixed and slidable jaws may not (or may) be mirror images of one another. For example, in the present illustration, one of the jaws (fixed jaw 88) presents a more angular profile, while the other of the jaws (slidable jaw 90) presents a more curved profile.

The clamp may have any other suitable configuration. For example, the jaws of the clamp may pivot open and closed in a clamshell arrangement. Alternatively, or in addition, the jaws of the clamp may move relative to another along a vertical axis instead of the horizontal axis shown in FIG. 5.

Wheel carrier 46 may include a lock 140 (e.g., a security lock). Lock 140 may be actuatable to place the lock in a locked position that blocks adjustment of clamp 86 (e.g., opening of the clamp and/or jaws) and/or opening of latches 106, 108 (and/or release of the strap)(see FIGS. 3 and 4). The lock may include a blocking member or cam 142 that is movable (e.g., pivotable) between locked and unlocked positions. In the locked position, blocking member 142 may be disposed in the rotational path of drive member 122, such as in the path of a fixture 144 that is fixed to threaded rod 124 at a distal end of drive member 122. In some embodiments, blocking member 142 may form a flange 146 that is received in a slot 148 formed in blocking member 142, or vice versa. In any event, blocking member 142 in the locked position may prevent drive member 122 from being turned and thus may prevent adjustment of clamp 86. In other words, the locked position of lock 140 may restrict adjustment of the clamp from a closed position to an open position having a jaw spacing sufficient for disconnection of wheel carrier 46 from bar 50. Stated differently, opening of the clamp may be restricted by the locked position of lock 140.

Lock 140 may require a security token, such as a key, to pivot blocking member 142 from outside the wheel carrier. For example, blocking member 142 may be attached to a lock core 150, which may be disposed in a lock housing 152. Further aspects of an exemplary lock core and/or lock housing that may be suitable are described in U.S. Pat. No. 4,976,123 and U.S. Pat. No. 5,119,654, which are incorporated herein by reference. The lock core and its attached blocking member 142 may be pivoted when a matching key is inserted in lock core 150 and turned. Thus, lock 140, in the locked position, may prevent an unauthorized person from opening clamp 86, thereby discouraging theft of the wheel carrier.

Figure 6:
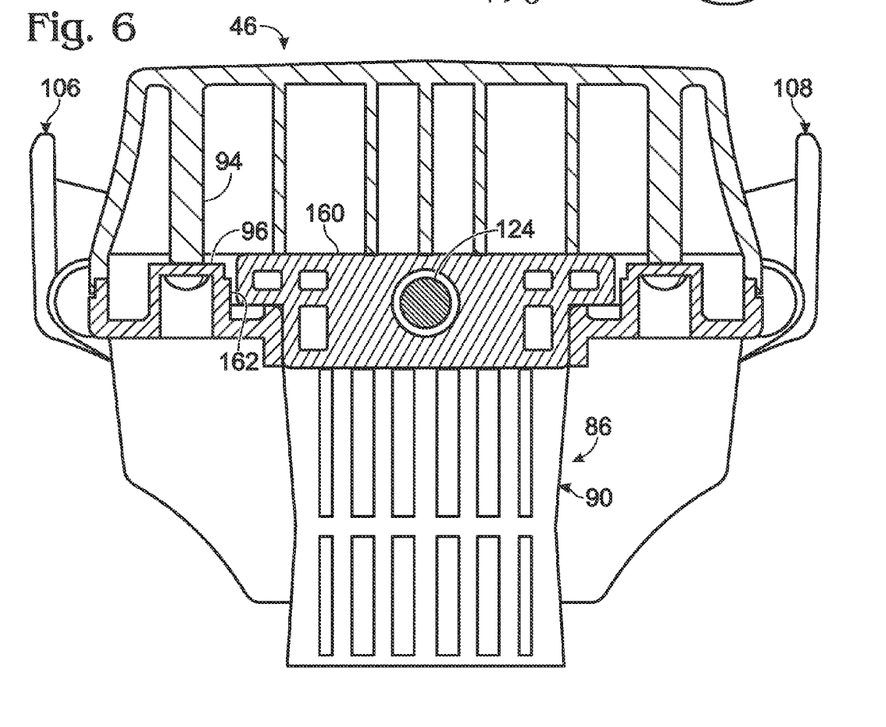
FIG. 6 is a cross-sectional view of the wheel carrier of FIG. 1, taken generally along line 6-6 of FIG. 5, with selected components of the wheel carrier omitted to simplify the presentation.

FIG. 6 shows a cross-sectional view of wheel carrier 46. Upper and lower body members 94, 96 may be assembled with one another around a head 160 of slidable jaw 90 to form a track or channel 162. Head 160 may be driven back and forth in channel 162 by rotation of threaded rod 124, to adjust the spacing of the clamp's jaws.

Figure 7:
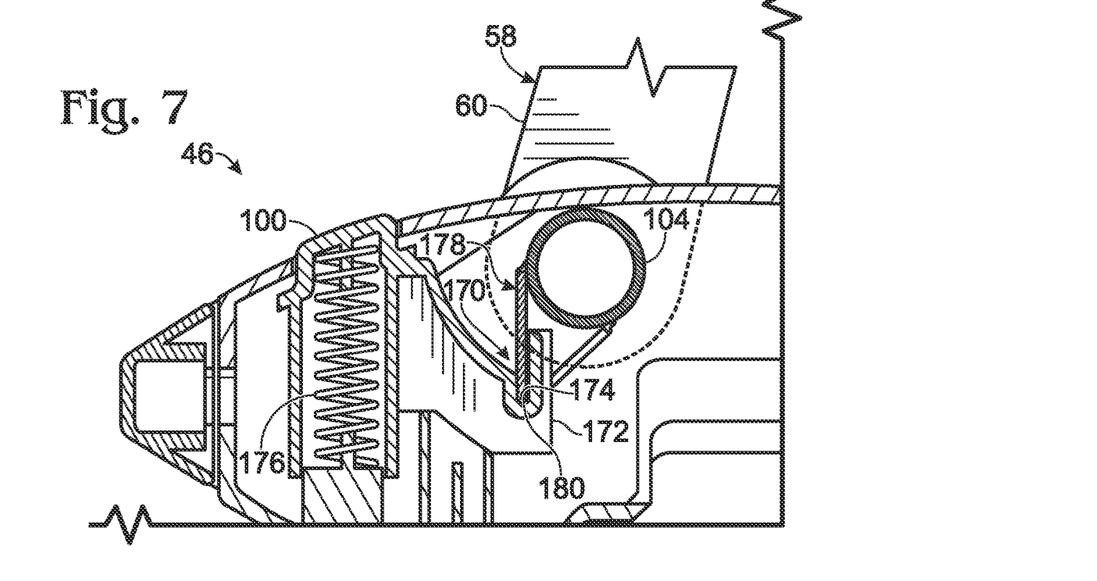
FIG. 7 is a longitudinal sectional view of a front region of the wheel carrier of FIG. 1, taken generally along line 7-7 of FIG. 3, with arms of the wheel carrier extending upward and fixed in a wheel receiving position, and with selected components of the wheel carrier omitted to simplify the presentation.

FIG. 7 shows a longitudinal sectional view of a front region of wheel carrier 46, with arm 60 extending upward and fixed in a wheel receiving position. Fork 58 (and thus its arms 60) may be fixed in the wheel receiving position using a detent 170. The detent may be formed by parts of button 100 and fork 58, as follows. Button 100 may provide a base region 172 forming a notch 174. The button may be biased upward by a spring 176. Fork 58 may include a tab 178 joined to axle 104, such as by welding. Tab 178 may project generally radially outward from the axle. The tab may V-shaped more centrally, with only one leg 180 of the tab present more laterally. The detent may be actuated by pivoting fork 58 upward from a storage position until leg 180 is received in notch 174, which may restrict pivotal motion of fork 58 in both rotational directions.

Figure 8:
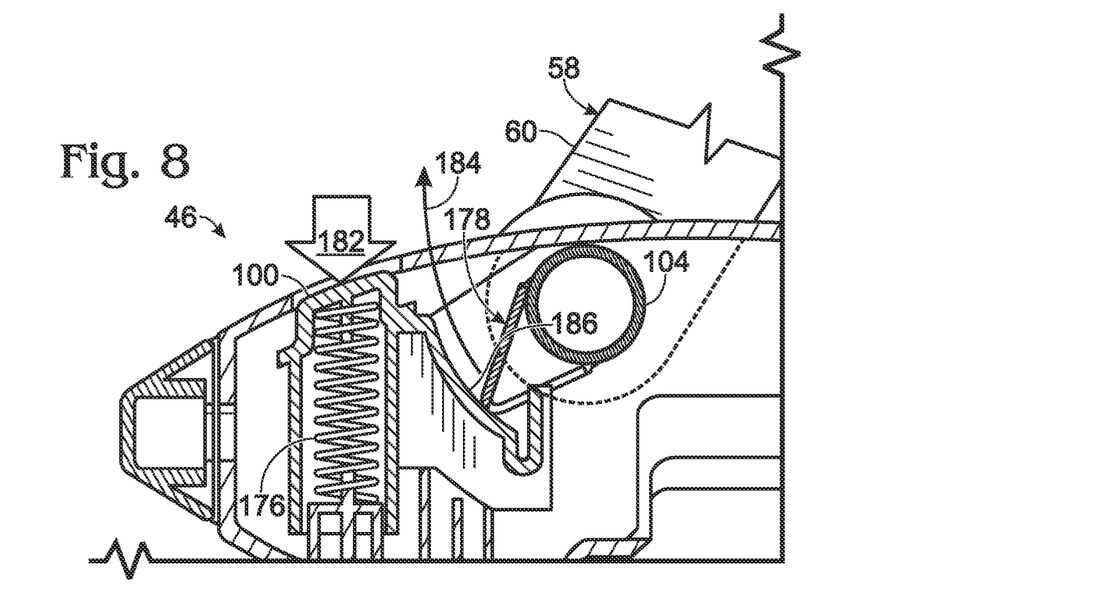
FIG. 8 is a view of the wheel carrier of FIG. 1, taken as in FIG. 7 but with the arms released from their locked position and lowered partway toward a storage position.

FIG. 8 shows arm 60 released from its locked position and pivoted partway toward a storage position. To release detent 170 (see FIG. 7), button 100 may be depressed, indicated by an arrow at 182, to compress spring 176 as button 100 moves downward, thereby removing leg 178 from notch 174. Fork 58 then may be pivoted, indicated by an arrow at 184. The more central V-shaped region of the tab may (or may not) engage a ramp 186 formed by button 100. Ramp 186 may be structured to permit a user to pivot arms 60 from a storage position to a wheel receiving position without pressing button 100.

Figure 9:
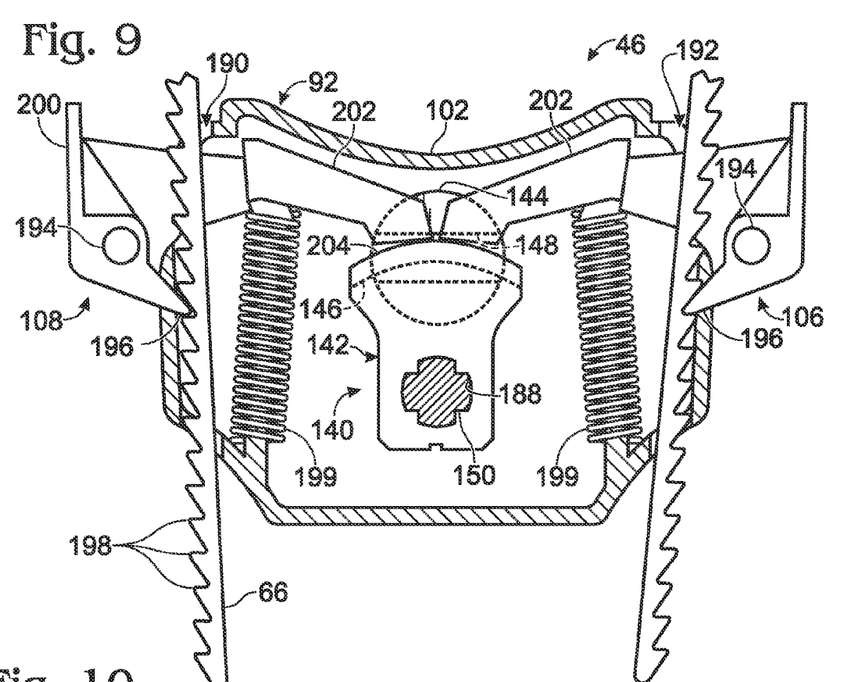
FIG. 9 is a cross-sectional view of the wheel carrier of FIG. 1, taken generally along line 9-9 of FIG. 5 through a lock of the wheel carrier, with both ends of the strap secured by latches and with the lock disposed in a locked position that blocks unauthorized removal of a wheel carrier from the vehicle rack and unauthorized removal of a bicycle wheel from the wheel carrier.

FIG. 9 shows a cross-sectional view of wheel carrier 46 taken through lock 140 with the lock disposed in a locked position. The rotary position of blocking member 142 may be determined by the rotary position of lock core 150, which may be received in an opening 188 defined by the blocking member.

The lock may be flanked by opposing channels 190, 192 defined by openings formed in body 92. Each channel may receive an end region of strap 66.

Latches 106, 108 may collectively hold the strap in a secured configuration. The latches may be operated independently from one other. Each latch may be movable with respect to body 92, to adjust the latch between closed (secured) and open (released) positions. Each latch may be coupled pivotably to body 92 by a respective pin 194. Each latch may include a pawl 196 that is received between adjacent teeth 198 of strap 66, to restrict longitudinal motion of an end region of the strap. Each latch may be connected to a spring 199 that urges pawl 196 into engagement with teeth 198. The teeth may be biased in shape, to selectively permit tightening relative to loosening of the strap. Each latch may include an external lever or tab 200, to permit a user to pivot pawl 196 out of engagement with the teeth, from outside the wheel carrier. However, each latch also may be equipped with an internal lever 202 that also controls the ability of the latch to pivot. When lock 140 and/or blocking member 142 is in the locked position, as in FIG. 9, an end surface 204 of the blocking member may be situated to obstruct motion of internal lever 202 that would permit pawl 196 to disengage teeth 198. For example, in the present illustration, end surface 204 interferes with downward motion of the end of each internal lever 202, thereby preventing release of strap 66 at both end regions thereof (when both have been secured by their respective latches). In some embodiments, blocking member 142 may function as a cam that bears against internal levers 202 (e.g., urging them upward in the present illustration), as the lock is placed into the locked position. Accordingly, blocking member 142 may be eccentrically mounted with respect to end surface 204, such that the distance from the pivot axis of blocking member 142 to distinct circumferential positions of end surface 204 is different.

Blocking member 142, while preventing the ability of latches 106, 108 to be opened/released (and/or preventing the release of the strap and/or end regions thereof), also may block rotation of fixture 144 of the drive member. As described previously with respect to FIG. 5, flange 146 of blocking member 142 may be received in slot 148 of fixture 144 to prevent the drive member from being turned. Therefore, lock 140 may act to block release/removal of strap 66 and adjustment of clamp 86 at the same time, thereby simultaneously discouraging theft of the wheel carrier and the wheel.

Figure 10:
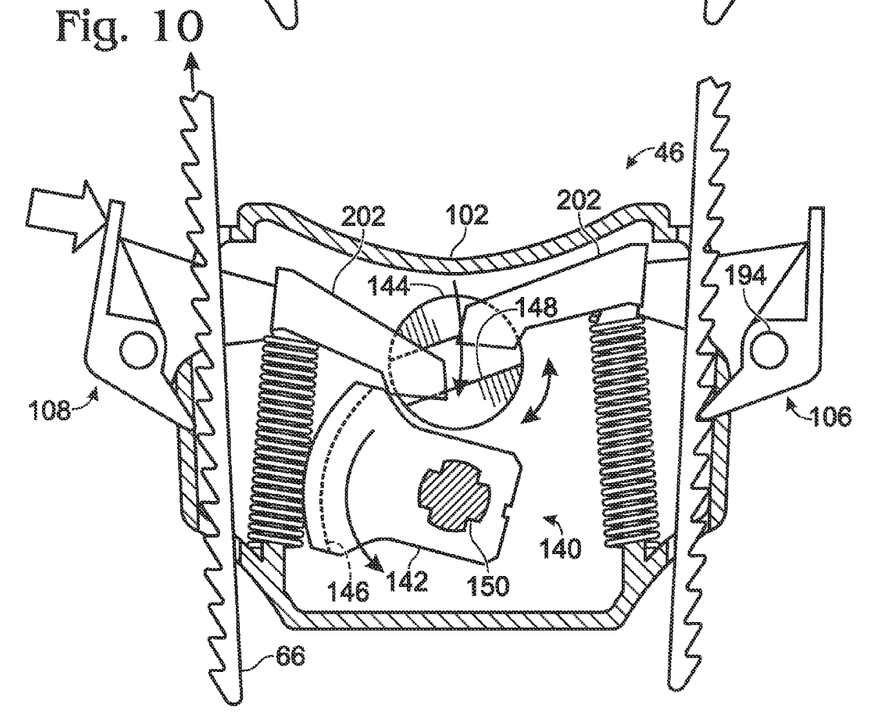
FIG. 10 is a cross-sectional view of the wheel carrier of FIG. 1, taken as in FIG. 9, with the lock disposed in an unlocked position that permits clamp adjustment for removal of the wheel carrier from the vehicle rack and latch operation for removal of the bicycle wheel from the wheel carrier.

FIG. 10 shows lock 140 disposed in an unlocked position that permits removal of the wheel carrier from the vehicle rack (following permitted adjustment (i.e., opening) of clamp 86) and removal of the bicycle wheel from the wheel carrier (following permitted opening of at least one of latches 106, 108). In the unlocked position, blocking member 142 may be pivoted out of the travel paths of latches 106, 108 and fixture 144, thereby permitting pivotal motion of internal levers 202 that opens latches 106, 108 (and releases the strap and/or end regions thereof) and also permitting turning of the drive member that opens the jaws of the clamp.

The various structural members disclosed herein may be constructed from any suitable material, or combination of materials, such as metal, plastic (e.g., nylon), rubber, or any other materials with sufficient structural strength to withstand the loads incurred during use. Materials may be selected based on their durability, flexibility, weight, and/or aesthetic qualities.

The present disclosure provides methods of mounting a bicycle wheel on a vehicle rack and or wheel carrier. The bicycle wheel may be isolated from the frame of the bicycle or already may be mounted to the frame while the method is performed.

The bicycle wheel may be connected to a base of a wheel carrier using at least one strap, which may be secured to the base over a rim of the bicycle wheel. A tire of the bicycle wheel may be engaged with the base and may be received in a recessed region of the base. One or more latches of the base may be utilized to secure the strap. An axle of the bicycle wheel may be disposed in slots defined by a pair of arms of the wheel carrier.

The base may be mounted on a load supporting bar of a vehicle rack. The base may include a clamp that is used to perform mounting.

The clamp and/or the latches may be locked to restrict opening of either by an unauthorized person. In some embodiments, the same security lock may be utilized to lock a pair of latches, a clamp and at least one latch, or a clamp and a pair of latches, among others.

II. Examples

The following examples describe selected aspects and embodiments of the present disclosure, particularly other exemplary vehicle racks and wheel carriers.

Example 1

Figures 11, 12, 13:
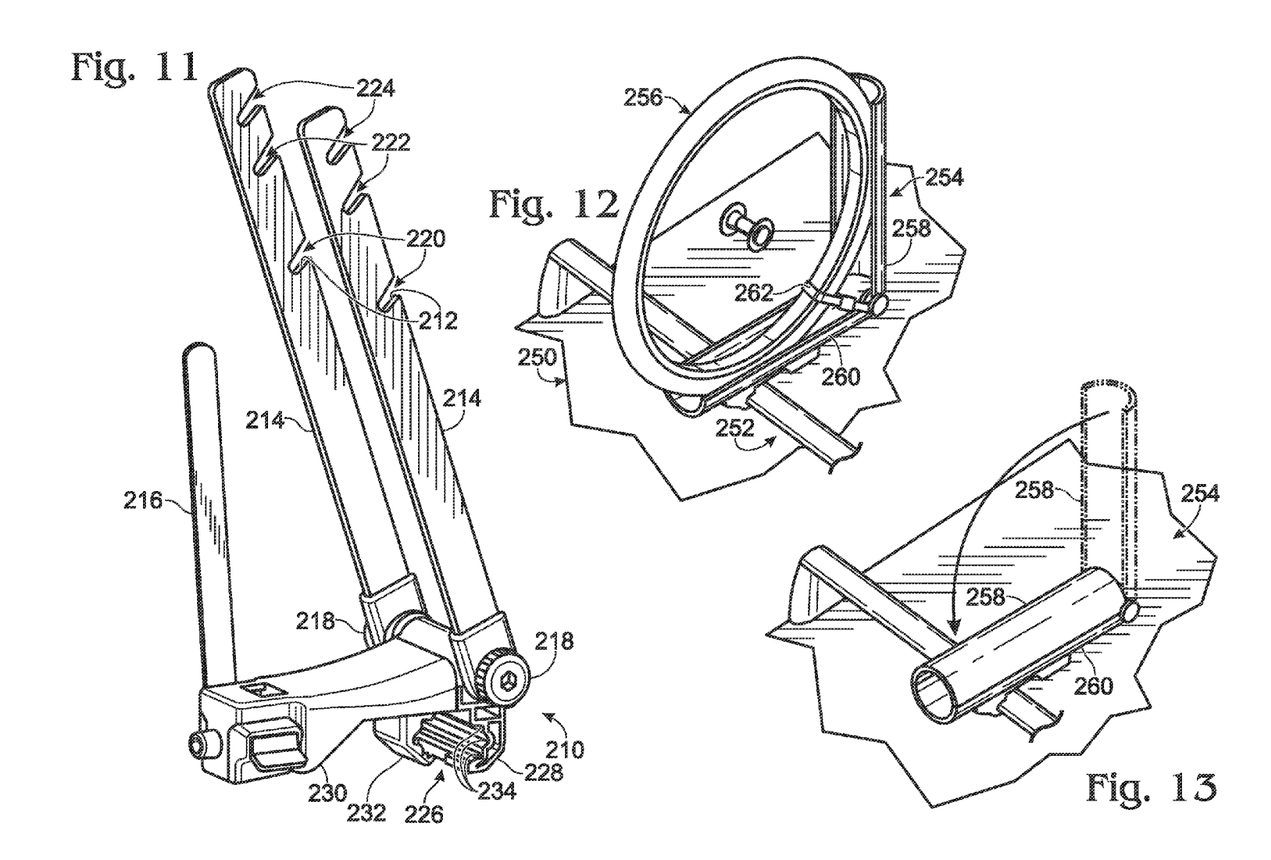
FIG. 11 is a view of a second embodiment of a wheel carrier that may be used to mount a wheel above a vehicle rack, in accordance with aspects of the present disclosure.
FIG. 12 is a fragmentary view of a vehicle supporting a vehicle rack that includes a third embodiment of a wheel carrier, with a wheel mounted on the wheel carrier, in accordance with aspects of the present disclosure.
FIG. 13 is a view of the vehicle, rack, and wheel carrier of FIG. 12 with the wheel removed and the wheel carrier collapsed to a storage position.

FIG. 11 shows a second embodiment 210 of a wheel carrier that may be used to mount a wheel above a vehicle rack. Wheel carrier 210 may include any combination of the elements and features disclosed above for wheel carrier 46 (see FIGS. 1-10).

A wheel may be located by placing the axle of the wheel in a pair of corresponding slots 212 in a pair of upright arms 214. The wheel then may be retained by a strap 216 near the bottom of the assembly. A quick release device on the wheel's skewer assembly may be tightened for additional stability, but this is not required.

The strap may be lockable with a security lock, such as an SKS lock. This captures the rim and locks the wheel to the carrier.

Wheel mounts currently on the market require the wheel to be clamped to the mount with the wheel skewer. To adjust the skewer one needs access to both sides of the wheel up high on the top of the vehicle. This can be very awkward or impossible for the user. In contrast, the disclosed design allows the user to mount the wheel with only accessing one side and along the lower edge of the wheel. This feature is particularly helpful when the rack is being used on a tall vehicle and/or by a relatively short person.

The arms may fold down when not holding a wheel. To fold arms 214, a knob 218 on either side of the arms at their base may be turned. The arms then can be lowered to a horizontal position.

Arms 214 may have multiple pairs of slots 212 to hold different sizes of wheels and still allow the strap to reach around the rim. Distinct pairs 220-224 of slots 212 positioned along the arms may, for example, be designed, respectively, for 20", 24"-700c-26", and 29" wheels.

Attachment of wheel carrier 210 to a crossbar may be accomplished with a slide clamp 226. The clamp may incorporate a fixed claw 228 on the front portion of a body 230 of the wheel carrier and a sliding claw 232 that moves horizontally under body 230 and clamps a rear side of the crossbar. The sliding claw may be driven by a long screw with a knob at the front of body 230. Notches 234 in both claws may enable the clamp to mount to round, square, and factory aero crossbars.

To lock the mount to the crossbars, a lock used to lock the wheelstrap also prevents the claw adjustment screw from turning. If the claw adjustment screw cannot be turned, the claw cannot be loosened and the mount is secure on the crossbar.

Example 2

FIG. 12 shows a vehicle 250 supporting a vehicle rack 252 that includes a third embodiment 254 of a wheel carrier, with a wheel 256 mounted on the wheel carrier. Wheel carrier 254 may include an upper tray 258, which may extend upward (i.e., an upright tray), and a lower tray 260, why may extend horizontally. The trays may be partial cylinders in some embodiments. Trays 258, 260 may be pivotably connected to one another, and tray 258 may be secured to a bar of the vehicle rack using a clamp. A strap 262 may secure the wheel near an interface of the upper and lower trays. In this clamshell concept, the wheel carrier retains the wheel by engaging the tire and the rim at three points, namely, one point on the tire with each tray and one point on the rim with the strap. The wheel hub is not touched. The wheel may be retained with a single strap.

FIG. 13 is taken as in FIG. 12 with the wheel removed and wheel carrier 254 collapsed to a storage position, in which upper tray 258 has been folded down to form a cylinder with lower tray 260.

Example 3

Figure 14:
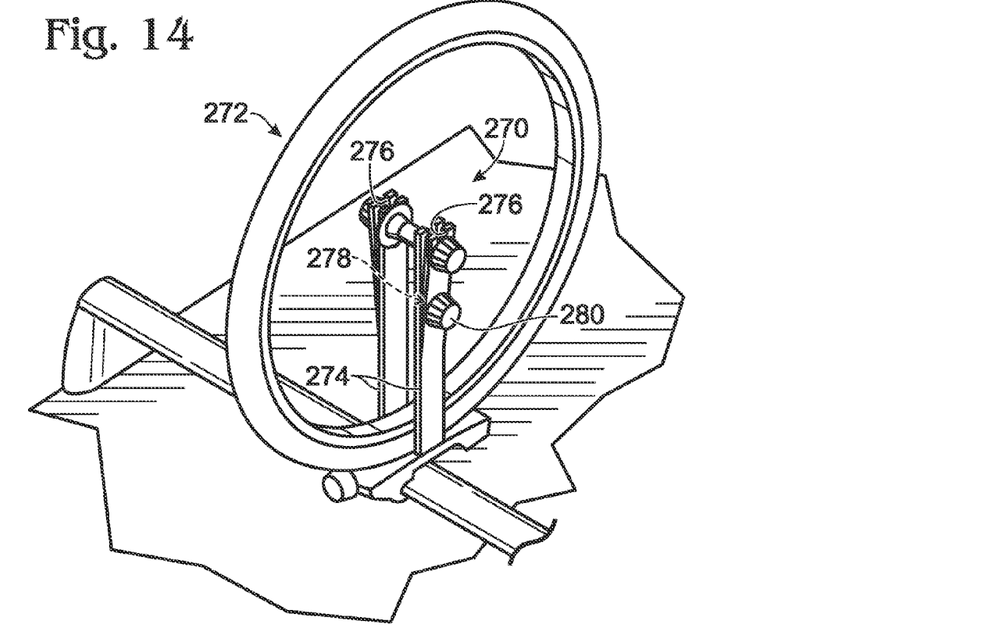
FIG. 14 is a fragmentary view of a vehicle supporting a vehicle rack that includes a fourth embodiment of a wheel carrier, with a wheel mounted on the wheel carrier, in accordance with aspects of the present disclosure.

FIG. 14 shows a vehicle supporting a vehicle rack that includes a fourth embodiment 270 of a wheel carrier, with a wheel 272 mounted on the wheel carrier. The carrier may include a pair of upwardly extending arms 274. Each arm may include a slot 276 formed in a distal end of the arm. One (or both) of the arms may include a distal fork that allows the arm to be expanded at the distal fork using a jackscrew 278 connected to a knob 280. The expanding arm effectively mimics attachment with a skewer assembly but can be activated from one side of the wheel and at a lower place along the arm for easier access.

Example 4

Figure 15:
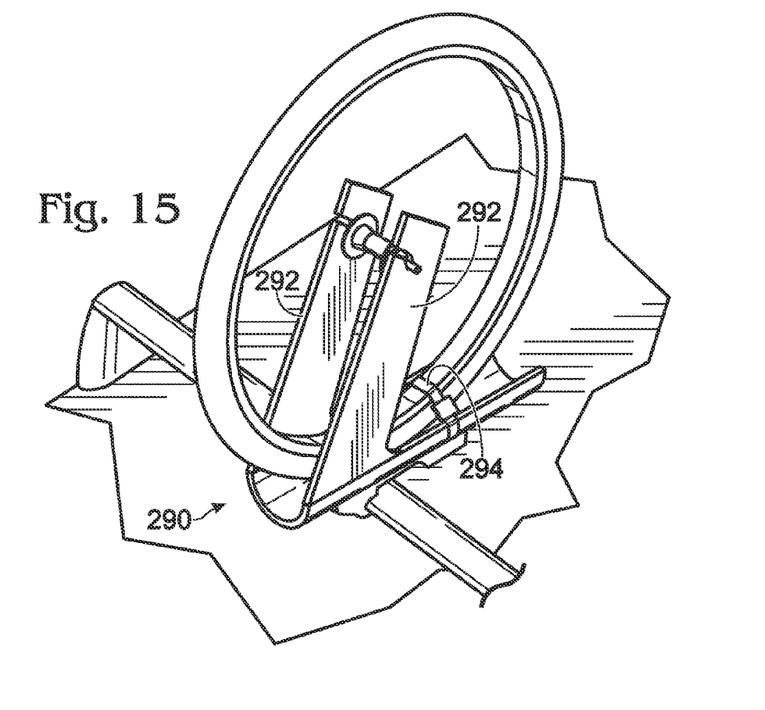
FIG. 15 is a fragmentary view of a vehicle supporting a vehicle rack that includes a fifth embodiment of a wheel carrier, with a wheel mounted on the wheel carrier, in accordance with aspects of the present disclosure.

FIG. 15 shows a vehicle supporting a vehicle rack that includes a fifth embodiment 290 of a wheel carrier, with a wheel mounted on the wheel carrier. Wheel carrier 290 is equipped with a pair of upright arms 292 and adds a wheelstrap 294 along the base to provide secure retention of the wheel. Tightening the wheel's quick release is optional since the wheelstrap is the primary retention mechanism.

Example 5

Figure 16:
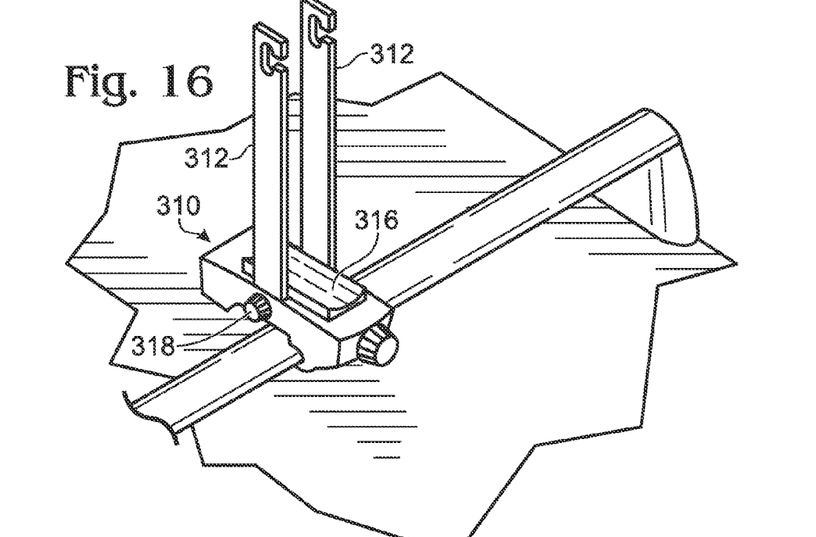
FIG. 16 is a fragmentary view of a vehicle supporting a vehicle rack that includes a sixth embodiment of a wheel carrier, in accordance with aspects of the present disclosure.

FIG. 16 shows a vehicle supporting a vehicle rack that includes a sixth embodiment 310 of a wheel carrier. Wheel carrier 310 utilizes a push-up concept. The carrier includes a pair of arms 312 defining slots that can receive the wheel's axle from the side of the arm. A platform 316 at the base may be raised by turning a knob 318, to engage the wheel, which pushes the wheel up in the slot, out of alignment with the mouth of the slot.

Figures 17, 18:
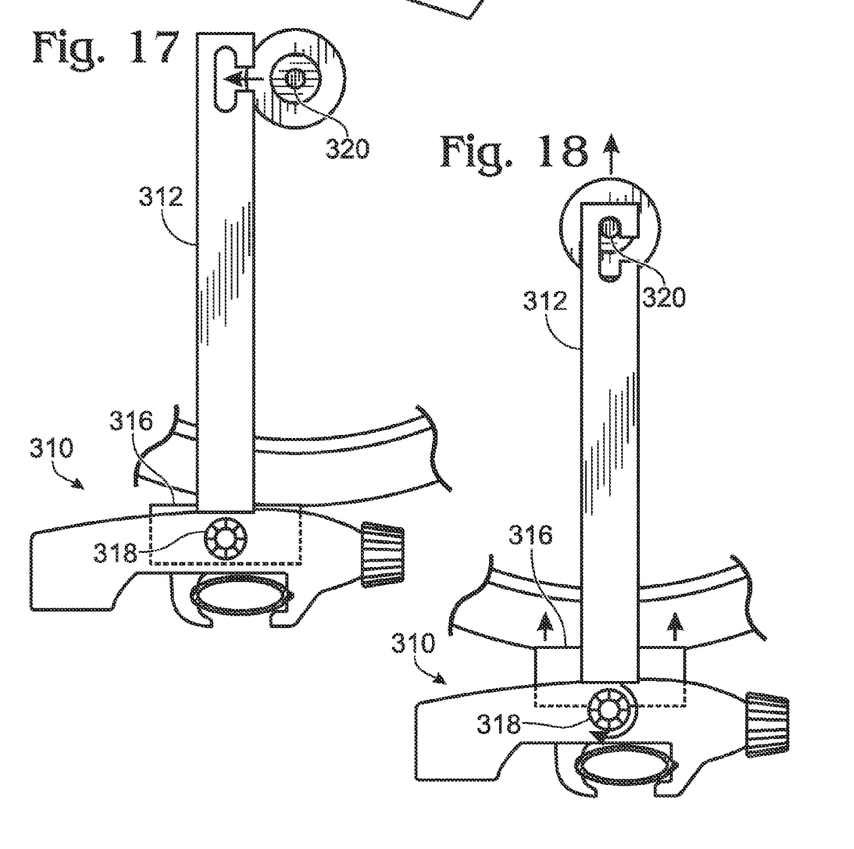
FIG. 17 is a side view of the wheel carrier of FIG. 16, taken with a wheel axle about to be received by arms of the wheel carrier.
FIG. 18 is a side view of the wheel carrier of FIG. 17, taken after the wheel axle has been received by the arms and urged into a retained position by elevating the wheel.

FIG. 17 shows wheel carrier 310 with an axle 320 of the wheel about to be received by arms 312.

FIG. 18 shows wheel carrier 310 after wheel axle 320 has been received by arms 312 and urged into a retained position by elevating platform 316 to raise the wheel.

Example 6

Figure 19:
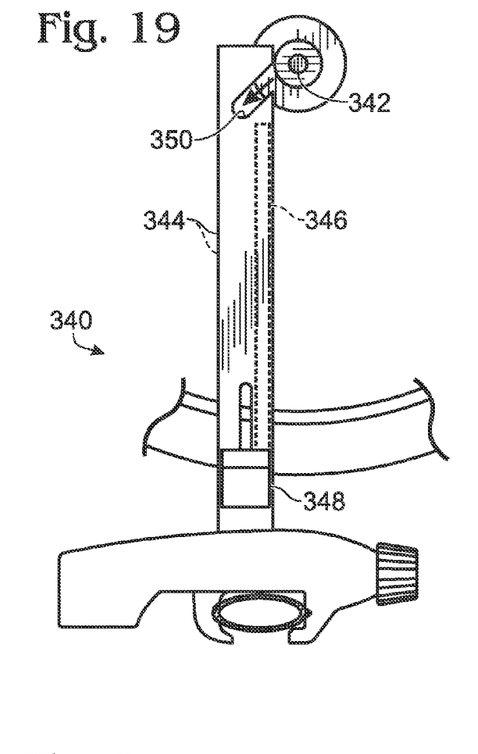
FIG. 19 is a side view of a seventh embodiment of a wheel carrier, taken with a wheel axle about to be received by arms of the wheel carrier, in accordance with aspects the present disclosure.

FIG. 19 shows a seventh embodiment 340 of a wheel carrier, taken with a wheel axle 342 about be received by arms 344 of the wheel carrier. At least one of arms 344 may include a slidable latch 346 operated manually by a user control 348. Wheel carrier 340 may include slots 350 pointed to the side of each arm 344. The sliding latch feature provides wheel retention security. The sliding latch may be the primary retention mechanism and tightening the wheel's quick release may be an optional secondary retention mechanism.

Figure 20:
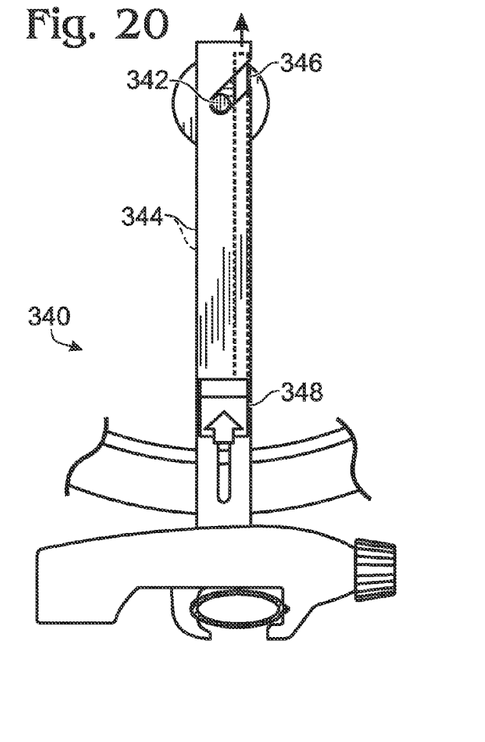
FIG. 20 is a side view of the wheel carrier of FIG. 19, taken after the wheel axle has been received by the arms and retained by sliding a latch.

FIG. 20 show wheel carrier 340 after wheel axle 342 has been received by arms 344 and retained by sliding latch 346.

Example 7

Figure 21:
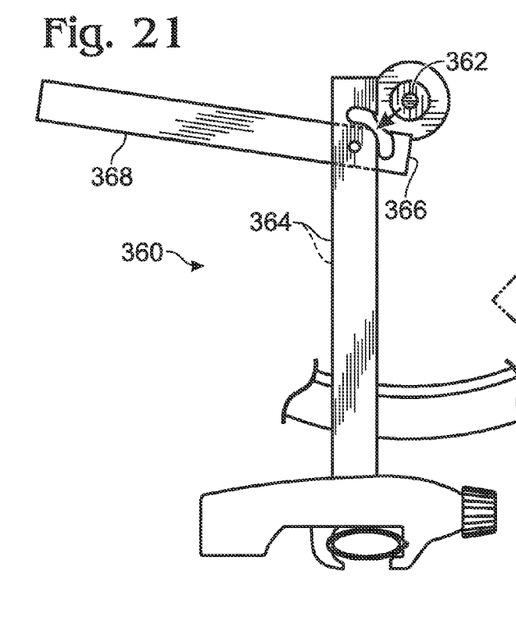
FIG. 21 is a side view of an eighth embodiment of a wheel carrier, taken with a wheel axle about to be received by arms of the wheel carrier, in accordance with aspects of the present disclosure.

FIG. 21 shows an eighth embodiment 360 of a wheel carrier, taken with a wheel axle 362 about to be received by arms 364 of the wheel carrier. Each arm may include a swing latch 366, which is functionally related to sliding latch 346 of FIGS. 19 and 20. Latch 366 is pivotable and may be attached to a long handle 368 for easy access and clear visual status indication.

Figure 22:
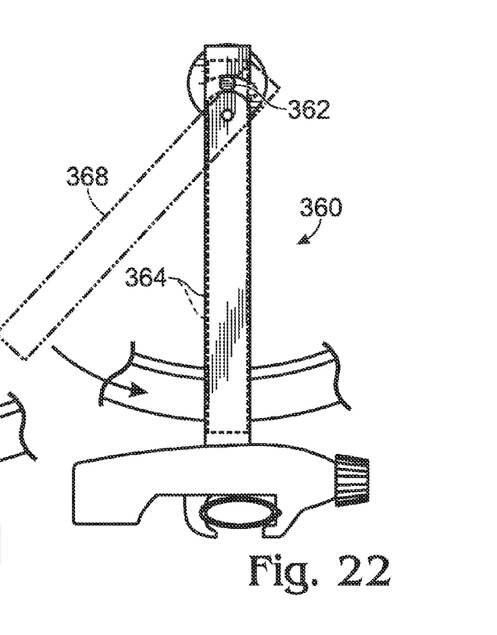
FIG. 22 is a side view of the wheel carrier of FIG. 21, taken after the wheel axle has been received by the arms and retained by pivoting a latch.

FIG. 22 shows wheel carrier 360, taken after wheel axle 362 has been received the arms 364 and retained by pivoting latch 366 (see FIG. 21).

III. Advantages

One or more of the following advantages may result from one or more of the vehicle racks and/or wheel carriers described above. Wheel mounts, as described, may be adaptable to various crossbar shapes and sizes with no loose parts. The mounts may be faster to install and remove compared to prior wheel mounts. The arms may fold down when the mount is attached to aero bars. The wheel strap may provide more secure wheel retention compared to a standard quick release mechanism. The wheel strap may lock to prevent wheel theft. The wheel strap may prevent wheel spinning while driving. The wheel strap may provide quick, easy one-handed wheel mounting with clear indication of when the wheel is secured to the mount. A button and/or one or more knobs on the pivot may allow the arms to be folded down from either side of the mount. The locking wheel strap may be easily configurable to be accessed from either the left or right side of the mount. Using the wheel strap for fastening instead of a wheel skewer may lower the interaction points and moves them to one side of the wheel which makes it easier to mount and secure a wheel. Wheel mounts may be operated and secured with one hand.

We claim:

1. A wheel carrier for use with a vehicle rack to enable transport of a bicycle wheel that has been removed from a bicycle, comprising:

a base including a clamp to mount the base on a load supporting bar of a vehicle rack;

a pair of arms connected to the base and defining slots for receiving an axle of a bicycle wheel;

a tensioning device connected to the base;

a strap securable to the base with the tensioning device such that the strap is adjustably tensionable over a rim of the bicycle wheel to restrict removal of the wheel from the arms; and a security lock having a locked position that prevents an unauthorized person from opening the clamp and from releasing the strap when the strap is secured to the base, thereby allowing the same lock to discourage theft of the wheel carrier and the bicycle wheel.

2. The wheel carrier of claim 1, wherein the security lock is adjustable between locked and unlocked positions using a removable key.

3. The wheel carrier of claim 1, wherein the clamp includes a first jaw, a second jaw, and a drive member operatively coupled to the first jaw such that turning the drive member in one rotational direction causes the first jaw to move away from the second jaw, and wherein the locked position of the security lock prevents the drive member from being turned.

4. The wheel carrier of claim 1, wherein the tensioning device and the strap collectively form a ratchet mechanism.

5. The wheel carrier of claim 1, wherein the tensioning device includes at least one buckle that secures the strap to the base, wherein the at least one buckle is movable, when the security lock is in an unlocked position, between a closed position that secures the strap and an open position that releases the strap, and wherein the locked position of the security lock prevents movement of the at least one buckle from the closed position to the open position.

6. The wheel carrier of claim 5, wherein the at least one buckle includes a pair of buckles that collectively secure the strap to the base, and wherein the locked position of the security lock prevents movement of either buckle to the open position.

7. The wheel carrier of claim 6, wherein each buckle moves from the closed position to the open position by pivotal motion, and wherein the locked position of the security lock prevents the pivotal motion.

8. A wheel holder for use with a vehicle rack to enable transport of a bicycle wheel, comprising:

a base configured to be mounted on a load supporting bar of a vehicle rack, the base including a pair of latches;

a strap securable to the base over a rim of a bicycle wheel to hold the bicycle wheel adjacent the base, the strap having opposing ends regions that each are securable by a respective latch; and a security lock having a locked position that prevents an unauthorized person from releasing either end region of the strap when the strap is secured to the base, by preventing opening of either latch using the same security lock.

9. The wheel holder of claim 7, further comprising a pair of arms connected to the base and defining slots for receiving an axle of a bicycle wheel.

10. The wheel holder of claim 8, wherein each latch is provided by a buckle.

11. A vehicle rack for carrying a bicycle wheel that has been removed from a bicycle, comprising:

a load supporting bar configured to be attached to a vehicle such that the bar is oriented horizontally; and a wheel carrier mountable on the load supporting bar and including a base including a pair of buckles, a pair of arms connected to the base and defining slots for receiving an axle of a bicycle wheel, a strap having opposing end regions and securable to the base with the pair of buckles such that the strap is adjustably tensionable over a rim of the bicycle wheel to hold the bicycle wheel in the slots, and a security lock having a locked position that prevents release of either opposing end region of the strap by an unauthorized person.

12. The vehicle rack of claim 11, wherein the arms are connected pivotably to the base such that the arms can be raised to a wheel receiving position and lowered to a storage position, and wherein the wheel carrier includes a detent that fixes the arms in the wheel receiving position.

13. The vehicle rack of claim 12, wherein the wheel carrier further comprises a button operatively connected to the detent and depressible by a user to permit the pair of arms to be lowered to the storage position from the wheel receiving position.

14. The vehicle rack of claim 11, wherein the base includes a clamp that mounts the base to the load supporting bar.

15. The vehicle rack of claim 14, wherein the clamp includes a first jaw, a second jaw, and a drive member operatively coupled to first jaw such that turning the drive member causes the first jaw to travel along a linear horizontal axis, to adjust a spacing of the first and second jaws from each other.

* * * * *